United States Patent
Liu et al.

(10) Patent No.: US 10,079,759 B2
(45) Date of Patent: Sep. 18, 2018

(54) NAMING SCHEMES AND ROUTING PROTOCOLS IN INFORMATION CENTRIC NETWORKING NETWORKS

(71) Applicant: FUJITSU LIMITED, Kawasaki-shi, Kanagawa (JP)

(72) Inventors: Lei Liu, Sunnyvale, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 15/017,550

(22) Filed: Feb. 5, 2016

(65) Prior Publication Data

US 2017/0230282 A1    Aug. 10, 2017

(51) Int. Cl.
*H04L 12/721* (2013.01)
*H04L 12/741* (2013.01)

(52) U.S. Cl.
CPC ............ *H04L 45/72* (2013.01); *H04L 45/745* (2013.01)

(58) Field of Classification Search
CPC ..... H04L 45/72; H04L 45/745; H04L 67/327; H04L 45/306; H04L 67/2842; H04L 67/10
See application file for complete search history.

(56) References Cited

U.S. PATENT DOCUMENTS

| | | | |
|---|---|---|---|
| 2003/0195984 A1 | 10/2003 | Zisapel et al. | |
| 2014/0129736 A1* | 5/2014 | Yu | H04L 45/08 709/242 |
| 2015/0312300 A1* | 10/2015 | Mosko | H04L 63/164 713/171 |
| 2016/0043957 A1 | 2/2016 | Mendez et al. | |
| 2016/0094439 A1* | 3/2016 | Ravindran | H04L 45/306 709/238 |
| 2016/0105394 A1* | 4/2016 | Rangarajan | H04L 61/302 709/223 |
| 2016/0285671 A1* | 9/2016 | Rangarajan | H04L 67/327 |
| 2017/0078199 A1* | 3/2017 | Mosko | H04L 45/7453 |

OTHER PUBLICATIONS

L. Zhang, et al., "Named Data Networking," ACM Computer Communication Review, vol. 44, No. 3, pp. 66-73, Jul. 2014.
C.Tschudin and M.Sifalakis, "Named Functions and Cached Computations," CCNx Community Meeting, Xerox PARC, Palo Alto, Sep. 2013.
U.S. Office Action dated Sep. 11, 2017 in U.S. Appl. No. 15/043,434.
Final Office Action dated May 9, 2018 in U.S. Appl. No. 15/043,434.
Advisory Action dated Jul. 25, 2018 in U.S. Appl. No. 15/043,434.

* cited by examiner

*Primary Examiner* — Walli Butt
(74) *Attorney, Agent, or Firm* — Maschoff Brennan

(57) ABSTRACT

A method of packet handling in an information centric networking (ICN) network may be provided. A method may include receiving an interest packet at a network device, the interest packet comprising a name including one or more entries. The method may also include determining whether the name of the interest packet includes a specific symbol. Further, the method may include upon determining that the name of the interest packet includes the specific symbol, performing at least one action based on a final entry of the one or more entries.

14 Claims, 9 Drawing Sheets

| PIT At Router 120B | |
|---|---|
| /medical/data/Alex → /model/medical → /simulation/medical | 120A |
| /medical/data/Alex → /model/medical | 120B |

FIG. 2A

| PIT At Router 120F | |
|---|---|
| /medical/data/Alex → /model/medical | 120C |
| /medical/data/Alex | 130F |

FIG. 2B

| /Prefix | Interface |
|---|---|
| /video_compression | A_2 |
| /video_combiner | A_1 |
| /video_data | A_1 |

*FIG. 6A*

| /Prefix | Interface |
|---|---|
| /video_compression | B_3 |
| /video_combiner | B_2 |
| /video_data | B_1 |

*FIG. 6B*

| /Prefix | Interface |
|---|---|
| /video_compression | C_1 |
| /video_combiner | C_1 |
| /video_data/AreaA/ | C_2 |
| /video_data/AreaB/ | C_3 |
| /video_data/AreaC/ | C_4 |

*FIG. 6C*

| /Prefix | Interface |
|---|---|
| /video_compression/<br>← /video_combiner/<br>← /video_data/3/ | A_3 |
| /video_data/3/ | A_2 |

FIG. 7A

| /Prefix | Interface |
|---|---|
| /video_combiner/←<br>/video_data/3/ | B_3 |
| /video_data/AreaA/ | B_2 |
| /video_data/AreaB/ | B_2 |
| /video_data/AreaC/ | B_2 |

FIG. 7B

| /Prefix | Interface |
|---|---|
| /video_data/AreaA/ | C_1 |
| /video_data/AreaB/ | C_1 |
| /video_data/AreaC/ | C_1 |

FIG. 7C

NAMING SCHEMES AND ROUTING PROTOCOLS IN INFORMATION CENTRIC NETWORKING NETWORKS

FIELD

The embodiments discussed herein are related to naming schemes and/or routing protocols in information centric networking networks.

BACKGROUND

The Internet is currently based on an Internet Protocol (IP) structure, with a frame of reference of where content is located, for example, at a given IP address. In information centric networking (ICN) networks, the frame of reference is based on what content is requested, rather than where the content is located.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include methods of handling a packet in an information centric networking (ICN) network. According to one embodiment, a method may include receiving an interest packet at a network device, wherein the interest packet includes a name with one or more entries. The method may further include determining whether the name of the interest packet includes a specific symbol. In addition, the method may include, upon determining that the name of the interest packet includes the specific symbol, performing at least one action based on a final entry of the one or more entries.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIGS. 2A and 2B depict example pending interest tables (PITs) for various network devices of an ICN network;

FIGS. 6A, 6B, and 6C depict forwarding information bases (FIBs) for various network devices of an ICN network;

FIGS. 7A, 7B, and 7C illustrate example PITs for various network devices of an ICN network;

DESCRIPTION OF EMBODIMENTS

Figure 1:
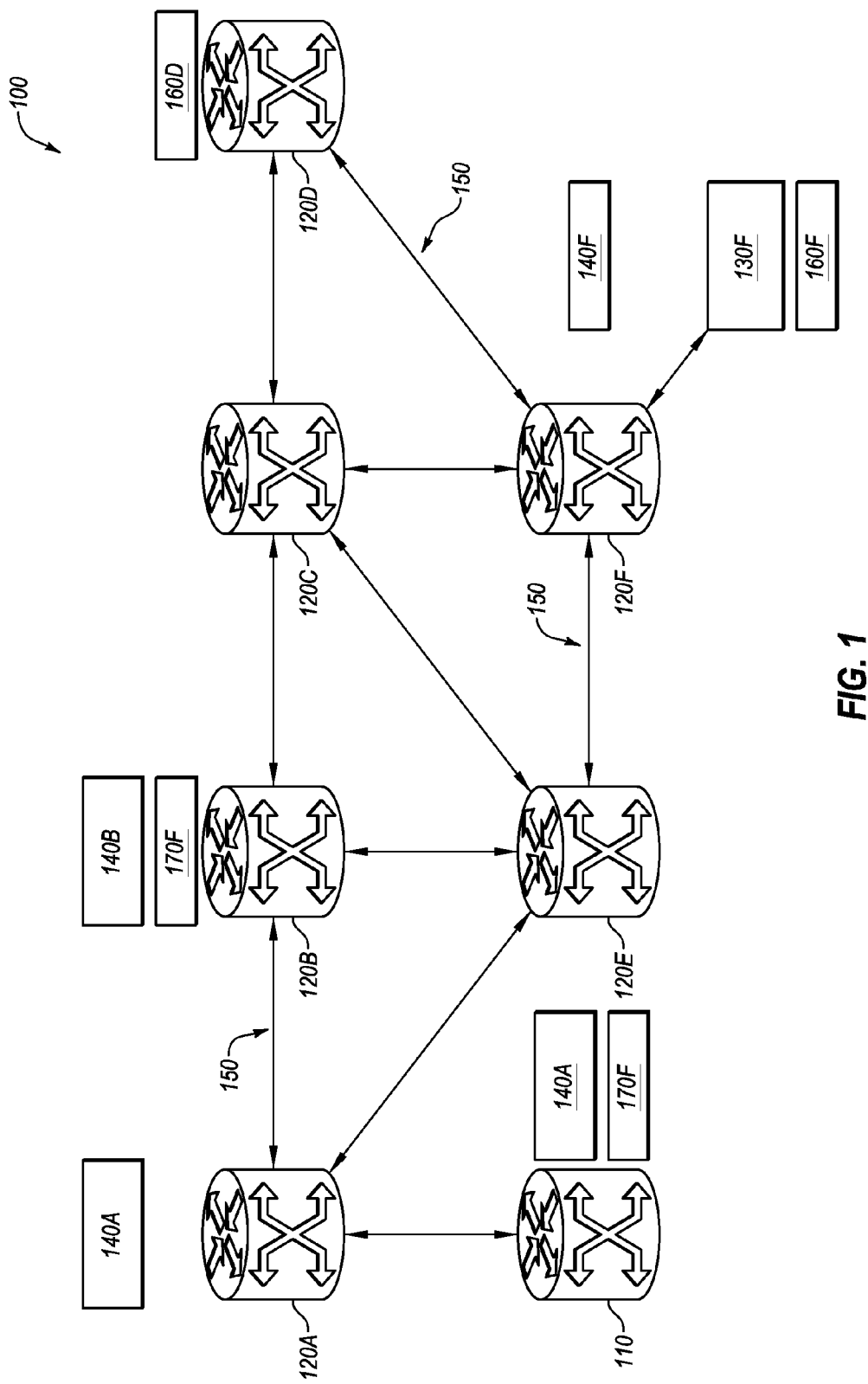
FIG. 1 is a diagram representing an example system for handling packets in an information centric networking (ICN) network.

The present disclosure relates to packet handling in an information centric networking (ICN). More specifically, embodiments of the present disclosure relate to naming schemes and/or routing protocols for a process chain in an ICN network. As will be appreciated by a person having ordinary skill in the art, various embodiments of the present disclosure, may enhance efficiency and/or performance of an ICN network.

According to one embodiment, a naming scheme, including a specific symbol (e.g., "→" or "←"), may be used to identify a process chain in an ICN network. Stated another way, a name of an interest packet (e.g., a packet requesting data), including a specific symbol and a specific format, may identify a process chain in an ICN network. As an example, a name of an interest packet may be "A→B→C" or "C←B←A", and may request processed data (also referred to herein as "cooked data"). In this example, the processed data may generated by processing raw data A by a function B, and then by further processing the processed data by a function C. Such a series of one or more processing steps may be referred to as a process chain. It is noted that the term "process chain" may also be referred to herein as a "service chain" or a "function chain."

Regardless of a naming scheme used, an interest packet may be routed within a network based on a final entry in a process chain. More specifically, for a name of an interest packet including an "→" (pointing to the right), raw data A may be placed at the beginning of the name, and the final entry in the process chain may be placed at the end of the name. For a name of an interest packet including an "←" (pointing to the left), raw data A may be placed at the end of the name and the final entry in the process chain may be placed at the beginning of the name. It is noted that symbols other than "→" or "←" may be used in a naming scheme, in accordance with embodiments disclosed herein. As one non-limiting example, an interest packet may be named "A*B*C" or "C*B*A", requesting, for example, raw data A to be processed by function B, and then further processed by a function C. As another example, an interest packet may be named "X!Y!Z" or "Z!Y!Z", requesting, for example, raw data X to be processed by a function Y, and then further processed by a function Z.

According to various embodiments of the present disclosure, a network device (e.g., a router) may forward an interest packet based on a final entry of a process chain (e.g., a final entry in a name of the interest packet). Further, upon receipt of the interest packet, a service router (e.g. the router that may provide the function of the process chain) may determine whether it is configured to provide the function as indicated by the final entry of the process chain. If so, the service router may update the name of the interest packet by removing the final entry of the process chain. More specifically, the service router may update the name of the interest packet by removing the last entry (in the case of "→") or the first entry (in the case of "←") from the name. Further, two entries may be added to a pending interest table (PIT) at the service router. As will be appreciated, the PIT entries may be used for sending processed data back to a consumer in the process chain. In some embodiments, a service router may forward the interest packet to a processing device (e.g., an application) associated with the service router, and the processing device (e.g., the application), may update a name of the interest packet by removing the last entry (in the case of "→") or the first entry (in the case of "←") from the name, and sending the updated interest packet back to the service router for further forwarding.

If the service router is not configured to provide the function as indicated by the final entry of the process chain, the service router may forward the interest packet according to a forwarding information base (FIB), which may include a name of a function (e.g., an application or content) and a corresponding interface to the function.

Embodiments of the present disclosure are now explained with reference to the accompanying drawings.

FIG. 1 is a diagram representing an example system 100 for handling packets in an ICN network, according to at least one embodiment of the present disclosure. System 100 may include a data consumer 110, one or more network devices 120 (e.g., network devices 120A, 120B, 120C, 120D, 120E, and 120F), one or more processing devices 130 (e.g., 130F), and a network 150.

In some embodiments, system 100 may be an ICN network. In these and other embodiments, data consumer 110 may request data via an interest packet (e.g., interest packets 140). In some embodiments, the interest packet may identify each step in the processing chain. For example, an interest packet from data consumer 110 may identify a processing step (e.g., to be performed at processing device 130F) and another processing step (e.g., to be performed at network device 120B). Furthermore, one or more of network devices 120 and processing device 130 may generate a data packet, which is a packet that provides data (also referred to herein as "content") as requested by an interest packet.

Data consumer 110 may include any device, system, component, or collection of components configured to request content. Data consumer 110 may be implemented as a computer (such as a desktop, laptop, server, etc.), as a mobile device (such as a cellular telephone, personal digital assistant (PDA), tablet, etc.), or as any other device connected to a network (e.g., a network-enabled thermostat, refrigerator, or other appliance). Data consumer 110 may include a processor, a memory, and a storage media. By way of example, during operation in network 150, data consumer 110 may send an interest packet to a network device 120. Because network 150 is operating as an ICN network, the interest packet may not indicate where the desired content is located, but instead may name the content desired by data consumer 110.

Network devices 120 may include any device, system, component, or collection of components configured to receive, handle, and/or process packets within network 150. Network devices 120 may each be implemented as a router, a gateway, a switch, or any other network element. In some embodiments, network devices 120 may each include a processor, a memory, and a storage media. Network devices 120 may each also include one or more interfaces over which network devices 120 communicate. An interface may include a physical and/or logical entrance or exit point for communication with a network device. For example, network device 120a may have a first interface that connects network device 120a to data consumer 110 and a second interface that connects network device 120a to network device 120b.

In some embodiments, network devices 120 may each include a content store, a PIT, and an FIB. The content store, PIT, and FIB may be physical or logical storage components or locations within the memory and/or the storage media of the network devices 120.

In some embodiments, a content store may operate as a storage location for content which has been requested by another device in network 150. By implementing one or more network devices in network 150 with content stores, content that is frequently requested may be located in the content stores of multiple network devices and may be provided to devices requesting the content more quickly and/or efficiently.

In some embodiments, the PIT may serve as a status indicator of what interest packets have been received by a network device for which the network device is still awaiting a content packet. For example, the PIT may have table entries associating requested content with interfaces of the network device that have received interest packets requesting the content. The PIT may be used when a content packet is received by the network device to identify which interfaces have requested that content so the content packet may be sent out from the network device on the interfaces that requested the content, referred to as requesting interfaces.

In some embodiments, the FIB may include a set of rules, protocols, or the like by which a network device may determine where to forward an interest packet when received by the network device. For example, when an interest packet is received at the network device, the FIB may be utilized to determine which interface or interfaces of the network device are used to transmit the interest packet to request the content.

Data consumer 110 may be configured to communicate with one or more network devices 120. For example, data consumer 110 may request processed data from network device 120a, which may store or otherwise have access to raw data that may eventually yield the processed data requested by data consumer 110 after one or more processing steps.

One or more processing devices 130, such as processing device 130F, may perform one or more processing steps of a process chain. Additionally or alternatively, one or more of network devices 120 may be configured to perform one or more of the processing steps of the process chain. Data consumer 110 and/or network devices 120 may communicate data before, during, and after a process chain using interest packets 140 and/or data packets 160 over network 150.

Network 150 may include any device, system, component, or combination thereof configured to provide communication between one or more of data consumer 110, network devices 120, and/or processing devices 130. By way of example, network 150 may include one or more wide area networks (WANs) or local area networks (LANs) in communication. In some embodiments, network 150 may include the Internet, including a global internetwork formed by logical and physical connections between multiple WANs and/or LANs. Additionally or alternatively, network 150 may include one or more cellular RF networks and/or one or more wired and/or wireless networks such as, but not limited to, 802.xx networks, Bluetooth® access points, wireless access points, IP-based networks, or the like. Network 150 may also include servers, substations, or other connection devices that enable one type of network to interface with another type of network. Additionally or alternatively, network 150 may include an Intranet, or one or more computing devices in communication within an organization or an in otherwise secure manner.

One example of a process chain may include processing steps associated with a video such as compressing, changing format, varying audio outputs, etc. As another example, a process chain may include processing steps associated with medical data, such as compiling raw data from sensors disposed about the body of a patient, filtering the data, modeling the data, and running a simulation with the data. Any size process chain for any data is contemplated within the scope of the present disclosure. In some embodiments, the steps of a process chain may be order-dependent (e.g., a specific order) or may be order-independent (e.g., may be done in any order), or may be mixed (e.g., some steps may be done in any order while others have a specific order).

For illustrative purposes only, a contemplated operation of system 100 will now be described. Initially, an interest packet 140A may be sent from data consumer 110 to network device 120A. Because network 150 is operating as an ICN network, interest packet 140A may not indicate where the desired content is located, but instead may name the content desired by data consumer 110. According to one embodiment, a name of interest packet 140A may include a specific symbol and a specific format. More specifically, a name of interest packet 140A may include a symbol between entries of the name. For example only, the symbol may include a "→" or a "←".

As noted above, an example process chain may include processing steps associated with medical data. In one specific example, as described below with reference to FIG. 1, raw medical data may be compiled (e.g., from sensors disposed about a body of a patient), the data may be modeled, and then the modeled data may be simulated. In this example, a name of interest packet 140A received at network device 120A may be "/medical/data/Alex→/model/medical→/simulation/medical".

In one embodiment, upon receipt of interest packet 140A, network device 120A may determine whether it may provide the function indicated in the final entry of the process chain (e.g., "/simulation/medical"). In this example, network device 120A is not configured to provide the indicated function and, thus, according to its FIB, network device 120A may forward interest packet 140A based on the final entry in the process chain (e.g., "/simulation/medical").

Continuing with this example, interest packet 140A may be forwarded to network device 120B, which is configured to perform the function indicated by the final entry in the process chain (e.g., "/simulation/medical"). Because network device 120B is configured to perform the function (e.g., the "simulation" function), network device 120B may update the name of the interest packet by removing the final entry from the name of the interest packet. Stated another way, an updated interest packet 140B having a name "/medical/data/Alex→/model/medical" may be generated at network device 120B.

Further, for example, two entries may be added to a PIT at network device 120B. One PIT entry may include the full name of the interest packet sent from network device 120A and received at network device 120B, and one PIT entry may include the updated name of interest packet 140B. FIG. 2A depicts an example PIT at network device 120B. It is noted that PIT may designate an interface to an application, rather than an interface to a network device. More specifically, for example, with reference to FIG. 2A, the designated interface for "/medical/data/Alex→/model/medical" may be an interface to an application associated with (e.g., attached to) network device 120B.

Continuing with this example, network device 120B may forward interest packet 140B (e.g., /medical/data/Alex→/model/medical") based on the final entry in the process chain (e.g., "/model/medical"). Interest packet 140B may be forwarded to network device 120C. Upon receipt of the interest packet, network device 120C may determine whether it may provide the function (e.g., the "model" function) indicated in the final entry in the process chain (e.g., "/model/medical"). In this example, network device 120C is not configured to provide the indicated function and, thus, according to its FIB, network device 120C may forward interest packet 140B to network device 120F based on the final entry in the process chain (e.g., "/model/medical").

In this example, network device 120F and, more specifically, processing device 130F may be configured to perform the processing step indicated by the final function in the process chain (e.g., "/model/medical"). Thus, network device 120F may update the name of the interest packet by removing the final entry from the name of the interest packet. Stated another way, an updated interest packet 140F having a name "/medical/data/Alex" may be generated at network device 120F.

Further, for example, two entries may be added to a PIT at network device 120F. One PIT entry may include the full name of the interest packet sent from network device 120C and received at network device 120F, and one PIT entry may include the updated name of the interest packet. FIG. 2B depicts an example PIT at network device 120F.

Network device 120F may then forward the interest packet (e.g., /medical/data/Alex) based on the remaining entry in the process chain (e.g., /medical/data/Alex). Interest packet 140F may be forwarded to network device 120D, which includes the requested data.

In response to receipt of interest packet 140F from network device 120F, network device 120D may send a data packet 160D (e.g., /medical/data/Alex) back to network device 120F. According to PIT entries, network device 120F may then send data packet 160D (e.g., /medical/data/Alex) to processing device 130F, which may perform a function (e.g., the model function) and send a data packet 160F (e.g., /medical/data/Alex→/model/medical) back to network device 120F. Based on PIT entries at network device 120F, Data packet 160F (e.g., /medical/data/Alex→/model/medical) may be sent back to network device 120C, then to network device 120B, which may forward the data packet to the simulation application which may be part of, or locally attached to, network device 120B to perform the function (e.g., the simulation function). A data packet 170F, which includes the processed data, may then be sent to data consumer 110 via network device 120A.

Although embodiments of the disclosure are described with use of an arrow as the specific symbol (e.g., "→" or a "←"), as noted above, it will be appreciated that any other suitable symbol (e.g., "&" or "'") may be used. Further, modifications, additions, or omissions may be made to FIG. 1 without departing from the scope of the present disclosure. For example, system 100 may include more or fewer elements than those illustrated and described in the present disclosure. System 100 may include more network devices, processing devices, and/or data consumers arranged in any topology. Additionally or alternatively, any length or combination of processing chain may be utilized.

As noted above, by using "←", an interest packet may be routed based on a final entry in the process chain. For example, given an interest packet C←B←A, the interest packet may be forwarded to function C using a default routing method, which may be referred to as "longest prefix matching." The router may check the local FIB table, select the first interface that may provide the longest prefix matching for the name of the interest packet for forwarding the interest packet. Further, function C (or a router connected to function C) may change the name of the interest packet to "B←A" and forward the interest packet to function B using the default routing method. Moreover, function B (or the router connected to function B) may change the name of the interest packet to "A" and forward the interest packet to raw data A using the default routing method.

Figure 3:
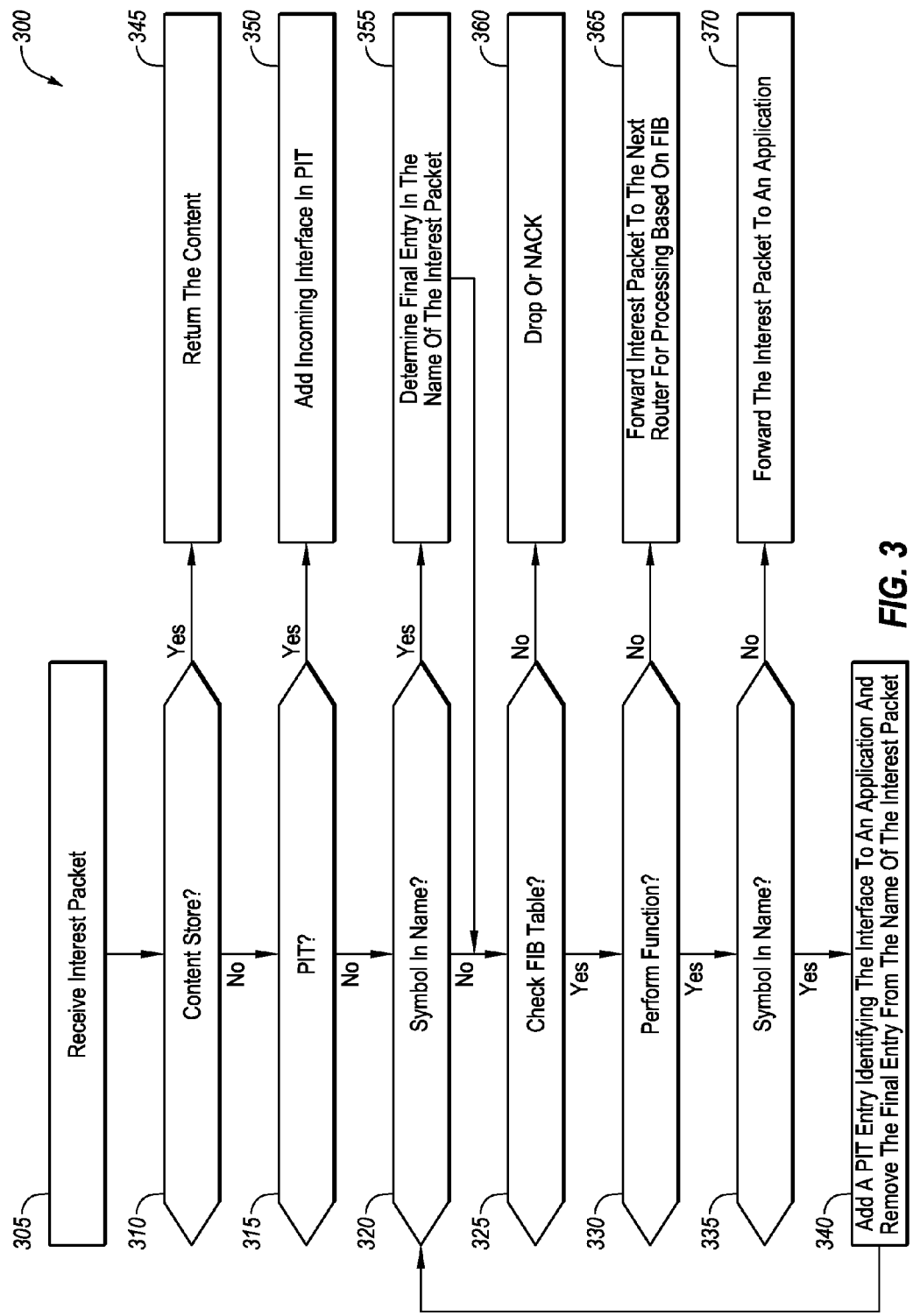
FIG. 3 is a flowchart of an example method for handling an interest packet in an ICN network.

FIG. 3 is a flowchart of an example method 300 for handling a received interest packet, in accordance with at least one embodiment of the present disclosure. Method 300 may be performed by any suitable system, apparatus, or device. For example, system 100 of FIG. 1 or one or more of the components thereof may perform one or more of the operations associated with method 300. In these and other embodiments, program instructions stored on a computer readable medium may be executed to perform one or more of the operations of method 300.

At block 305, an interest packet may be received at a network device (e.g., the network device 120b of FIG. 1) from an initial network device (e.g., the network device 120a of FIG. 1). The interest packet may include a name including one or more entries, and may identify each step in a process chain. Further, in some embodiments, entries of a name in an interest packet may identify a content request and/or indicate one or more functions to be performed in the process chain.

At block 310, a determination may be made as to whether the content requested in the interest packet is stored in the content store of the network device. For example, the network device may compare the name of the requested content with entries in the content store of the network device. If it is determined that the content requested is stored in the content store of the network device, method 300 may proceed to block 345. If it is determined that the content requested is not stored in the content store of the network device, method 300 may proceed to block 315.

At block 315, a determination may be made as to whether a PIT of the network device includes an entry for the interest packet (e.g., the requested content). For example, the network device may compare the name of requested content with entries in the PIT of the network device. If it is determined that the PIT of the network device includes an entry for the interest packet, method 300 may proceed to block 350. If it is determined that the PIT of the network device does not include an entry for the interest packet method 300 may proceed to block 320.

At block 320, a determination may be made as to whether a name of the interest packet includes a specific symbol (e.g., "→"). For example, the network device may parse the name of the interest packet for the specific symbol. If it is determined that the name of the interest packet includes the specific symbol, method 300 may proceed to block 355. If it is determined that the name of the interest packet does not include the specific symbol, method 300 may proceed to block 325.

At block 325, it may be determined if an FIB includes rules, protocol, or the like for forwarding the interest packet. For example, the network device may access its FIB to determine if the FIB includes rules, protocol, or the like for forwarding the interest packet. If the FIB of the network device does not include rules, protocol, or the like for forwarding the interest packet, method 300 may proceed to block 360. If the FIB of the network device includes rules, protocol, or the like for forwarding the interest packet, method 300 may proceed to block 330.

At block 330, a determination may be made as to whether the network device is configured to perform a requested function. For example, the network device may determine whether it, or an associated processing device, may perform the requested function. If it is determined that neither the network device nor an associated processing device is configured to perform the requested function, method 300 may proceed to block 365. If it is determined that the network device or an associated processing device is configured to perform the requested function, method 300 may proceed to block 335.

At block 335, a determination may be made as to whether a name of the interest packet includes a specific symbol (e.g., "→"). For example, the network device may parse the name of the interest packet for the specific symbol. If it is determined that the name of the interest packet does not include the specific symbol, method 300 may proceed to block 370. If it is determined that the name of the interest packet includes the specific symbol, method 300 may proceed to block 340.

At block 340, an entry designating an interface to an application (e.g., at the network device or at an associated processing device) may be added to the PIT, the final entry of the name of the interest packet may be removed, and method 300 may return to block 320. For example, the network device may add an entry designating an interface to an application to its PIT and remove the final entry of the name of the interest packet.

At block 345, the network device may send the content in a data packet back over the interface through which the interest packet was received.

At block 350, the network device may update the PIT entry for the interest packet to also indicate the interface over which the interest packet was received.

At block 355, the final entry in the name of the interest packet may be determined, and method 300 may proceed to block 325.

At block 360, the interest packet may be dropped and/or a negative-acknowledgement (NACK) may be sent.

At block 365, the interest packet may be forwarded to another network device (e.g., the next network device) for processing based on the FIB of the network device.

At block 370, the interest packet may be forwarded to an application (e.g., at the network device or at an associated processing device for performing the function) for processing.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

According to one embodiment, a contemplated operation of an ICN network may include a conditional processing loop. In this conditional processing loop, a service router may determine whether data received is satisfied. If not, a new interest packet may be issued from the service router to request the data again.

For example, a name of an interest packet for a process chain may be "A→B→C". During a contemplated operation, data A may be sent to a device (e.g., a service router) B for processing. Further, processed data (e.g., data A→B) may be sent to another device (e.g., another service router) C for further processing, and the final processed data (e.g., A→B→C) may be sent to a consumer. However, in some cases, data A, which is sent to device B, may not be satisfactory to device B. Thus, device B may request data A again (e.g., loop back to A). Similarly, processed data A→B, which is sent to device C, may not be satisfactory for device C. Therefore, device C may request that device B send processed data A→B again.

Figure 4:
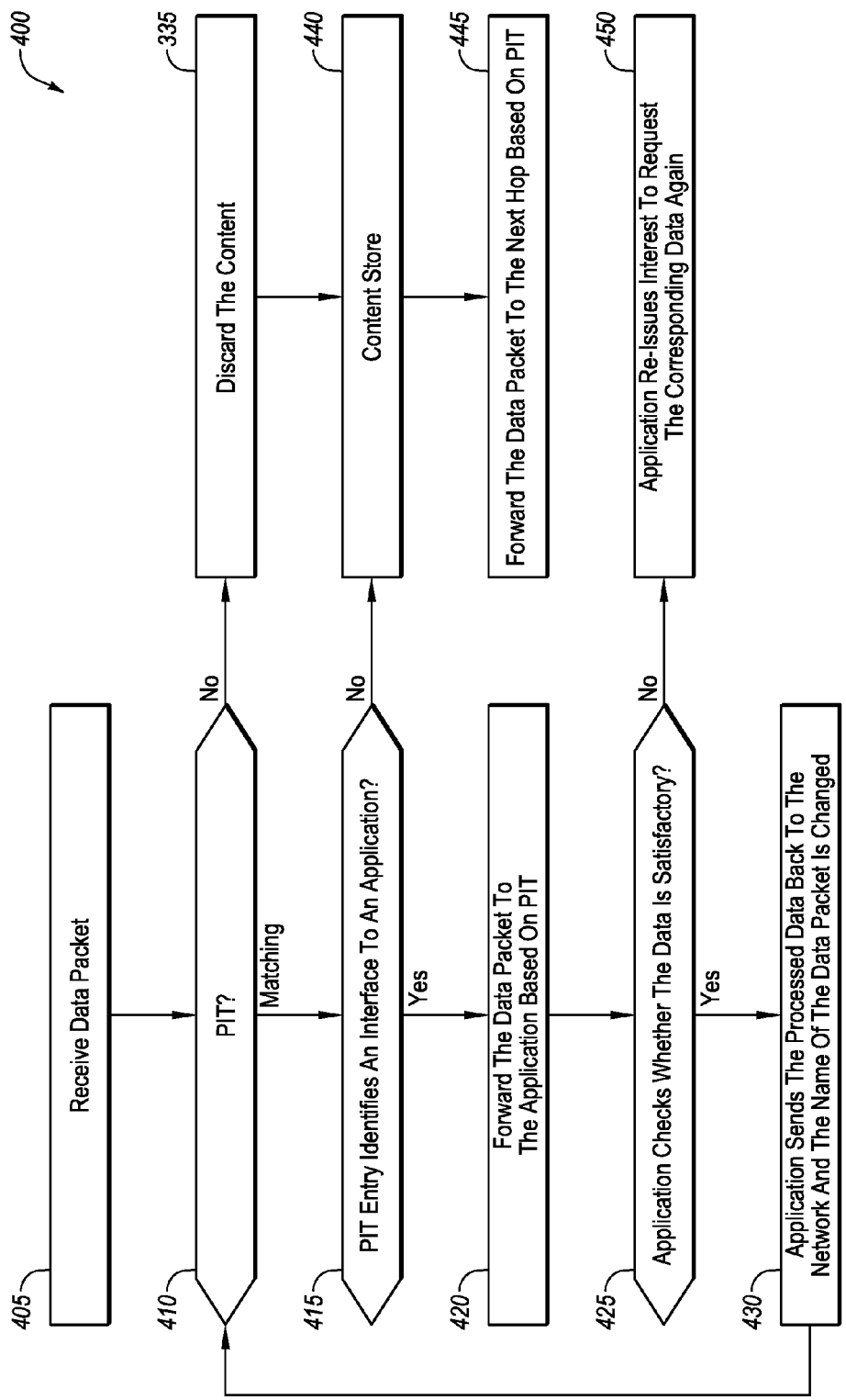
FIG. 4 is a flowchart of an example method for handling a data packet in an ICN network.

FIG. 4 is a flowchart of an example method 400 for handing a received data packet, in accordance with at least one embodiment of the present disclosure. Method 400 may be performed by any suitable system, apparatus, or device. For example, system 100 of FIG. 1 or one or more of the components thereof may perform one or more of the operations associated with method 400. In these and other embodiments, program instructions stored on a computer readable medium may be executed to perform one or more of the operations of method 400.

At block 405, a data packet, which may include a name and content, may be received at a network device.

At block 410, a determination may be made as to whether the network device has a matching PIT entry for the content in the data packet. For example, the network device may compare the name of the content with entries in the PIT of the network device. If it is determined that the network device does not include a PIT entry for the content in the data packet, method 400 may proceed to block 435. If it is determined that the network device includes a PIT entry for the content in the data packet, method 400 may proceed to block 415.

At block 415, a determination may be made as to whether the PIT identifies an interface to an application (e.g., an application for performing a requested function). For example, the network device may determine whether the PIT entry identifies an interface to an application operating on the network device or an application operating on an associated processing device. If it is determined that the PIT entry does not identify an interface to an application, method 400 may proceed to block 440. If it is determined that the PIT entry identifies an interface to an application, method 400 may proceed to block 420.

At block 420, the content of the data packet may be forwarded to the application based on the PIT entry. For example, the network device may provide the content to an application operating on the network device or to an associated processing device over an interface identified in the PIT entry.

At block 425, a determination may be made as to whether the content of the data packet is satisfactory. For example, the network device and/or the processing device may analyze the content to verify that the content is valid for the processing to be performed in the process chain. If it is determined that the content of the data packet is not satisfactory, method 400 may proceed to block 450. If it is determined that the content of the data packet is satisfactory, method 400 may proceed to block 430.

At block 430, the application may send the processed data back to the network (e.g., the network device associated with the application), the name of the data packet may be changed accordingly, and method 400 may return to block 410.

At block 435, the network device may discard the content of the data packet.

At block 440, the network device may store the content in its content store and method 400 may proceed to block 445.

At block 445, the data packet may be forwarded based on the PIT of the network device.

At block 450, the application may re-issue an interest request for the content.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 5:
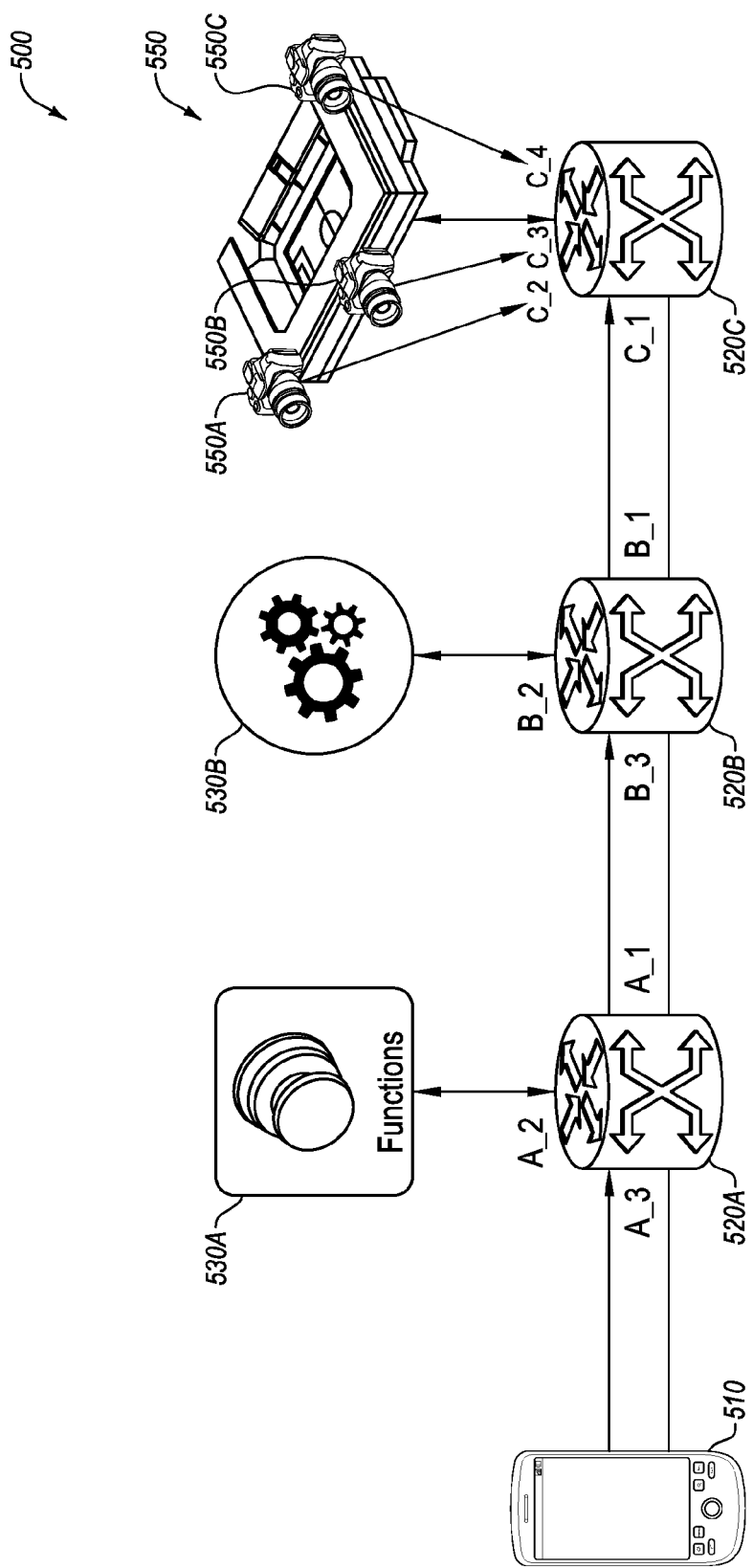
FIG. 5 is a diagram illustrating another example system for handling packets in an ICN network.

In some embodiments, some systems may include multiple sources of raw data (e.g., multiple video cameras). FIG. 5 depicts a system 500 including a consumer 510, network devices 520A, 520B, and 520C, processing devices 530A and 530B, and a data source 550, which may include three sources of data 550A, 550B, and 550C. More specifically, in this example, processing device 530A includes a video compressor and processing device 530B includes a video combiner. Data sources 550A, 550B, and 550C each include, for example, a video camera. Further, network device 520A may include interfaces A_1, A_2, and A_3, network device 520B may include interfaces B_1, B_2, and B_3, and network device 520C may include interfaces C_1, C_2, C_3, and C_4.

In this example, consumer 510, which may wish to receive multiple videos (e.g., live videos) from a show, may generate an interest packet named, for example only, "/video_compression/←/video_combiner/←/video_data/3/".

Continuing with the example of system 500, the interest packet may be forwarded to network device 520A based on the last entry in the interest packet's name ("/video_compression/"). Network device 520A may forward the interest packet to processing device 530A, which may forward the interest packet to network device 520A. Processing device 530A (or network device 520A) may changes the name of the interest packet to "/video_combiner/←/video_data/3/", and the interest packet may be forwarded to network device 520B. Network device 520B may forward the interest packet to processing device 530B, which may forward the interest packet to network device 520B. The interest message may request three pieces of video data. Thus, processing device 530B (or network device 520B) may issue three interest packets and may change the names of the interest packet to retrieve three different pieces of video data. The interest packets may be forwarded to network device 520C, which may send the interest packets to data sources 550A, 550B and 550C respectively. FIBS at network devices 520A, 520B, and 520C are respectively depicted in FIGS. 6A, 6B, and 6C.

With reference again to FIG. 5, it is noted that network device 520B may receive multiple data sets (e.g., multi-angle videos) before the data may be combined via processing device 530B. Thus, processing device 530B (or network device 520B) may issue multiple interest packets as mentioned above. More specifically, for example, network device 520B may issue the following 3 interest packets:
/video_data/AreaA/;
/video_data/AreaB/; and
/video_data/AreaC/.

Continuing with the example of system 500, data source 550, including data sources 550A, 550B and 550C, may generate a data packet having the name, for example only, "/video_data/AreaA/", "/video_data/AreaB/", and "/video_data/AreaC/". The data packet may be forwarded to network device 520C, which may forward the data packet to network device 520B. Network device 520B may send the data packet to processing device 530B, which may perform a function (e.g. video combination) and send the cooked data to network device 520B. Processing device 530B (or network device 520B) may change the name of the data packet "/video_combiner/←/video_data/3/". Network device 520B may send the data packet to network device 520A, which may forward the data packet to processing device 530A. Processing device 530A may perform a function and send the cooked data to network device 520A. Processing device 530A (or network device 520A) may change the name of the data packet to "/video_compression/←/video_combiner/←/video_data/3/". Processing device 530A may then forward the interest packet to consumer 510.

PITs at network devices 520A, 520B, and 520C are respectively depicted in FIGS. 7A, 7B, and 7C.

Figure 8:
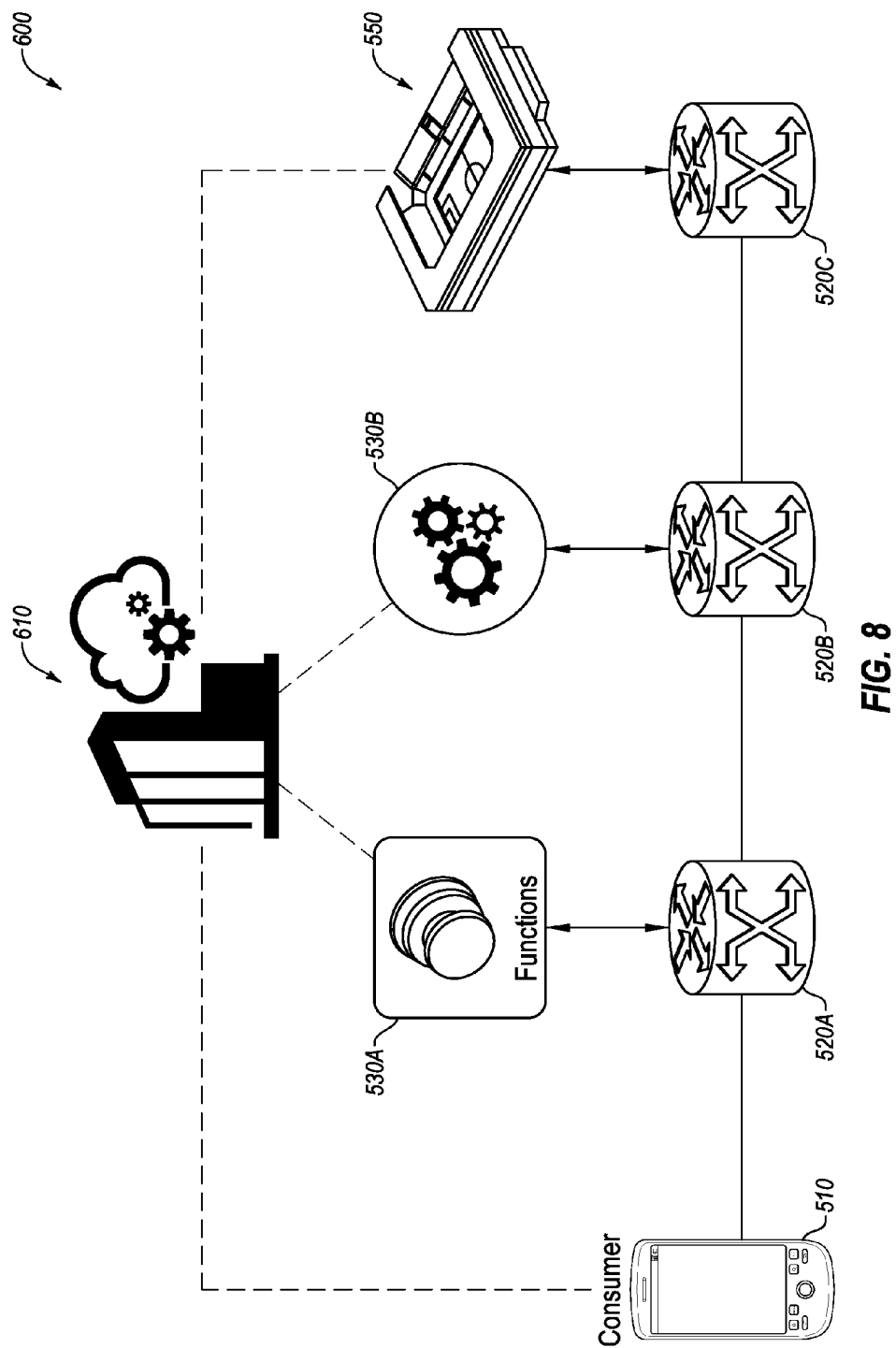
FIG. 8 is a diagram representing an example ICN system.

In various embodiments, a service provider may be required in an ICN network to provide process chain services. The service provider, which may connect raw data providers, function provides and consumers, may govern service agreements, naming policies, naming conversion policies, and authentication, authorization, and accounting (AAA) standards, for example. FIG. 8 depicts a system 600 including consumer 510, network devices 520A, 520B, and 520C, processing devices 530A and 530B, data source 550, and a service provider 610.

In a distributed model, network carriers and operators may be responsible for network control. A service provider may not be responsible for network control. Further, a fully distributed routing protocol (e.g. NLSR) may be implemented in the routers, which may exchange information to update FIB tables in each router.

In a centralized model, network carriers may allow at least a portion of a network to be controlled by the service provider based on a service agreement with the service provider. In this embodiment, the service provider may have a virtualized view of the network, and the service provider may control the network via, for example, a software-defined networking (SDN) controller. In addition, FIB tables in each router may be updated by the centralized SDN controller.

Figure 9:
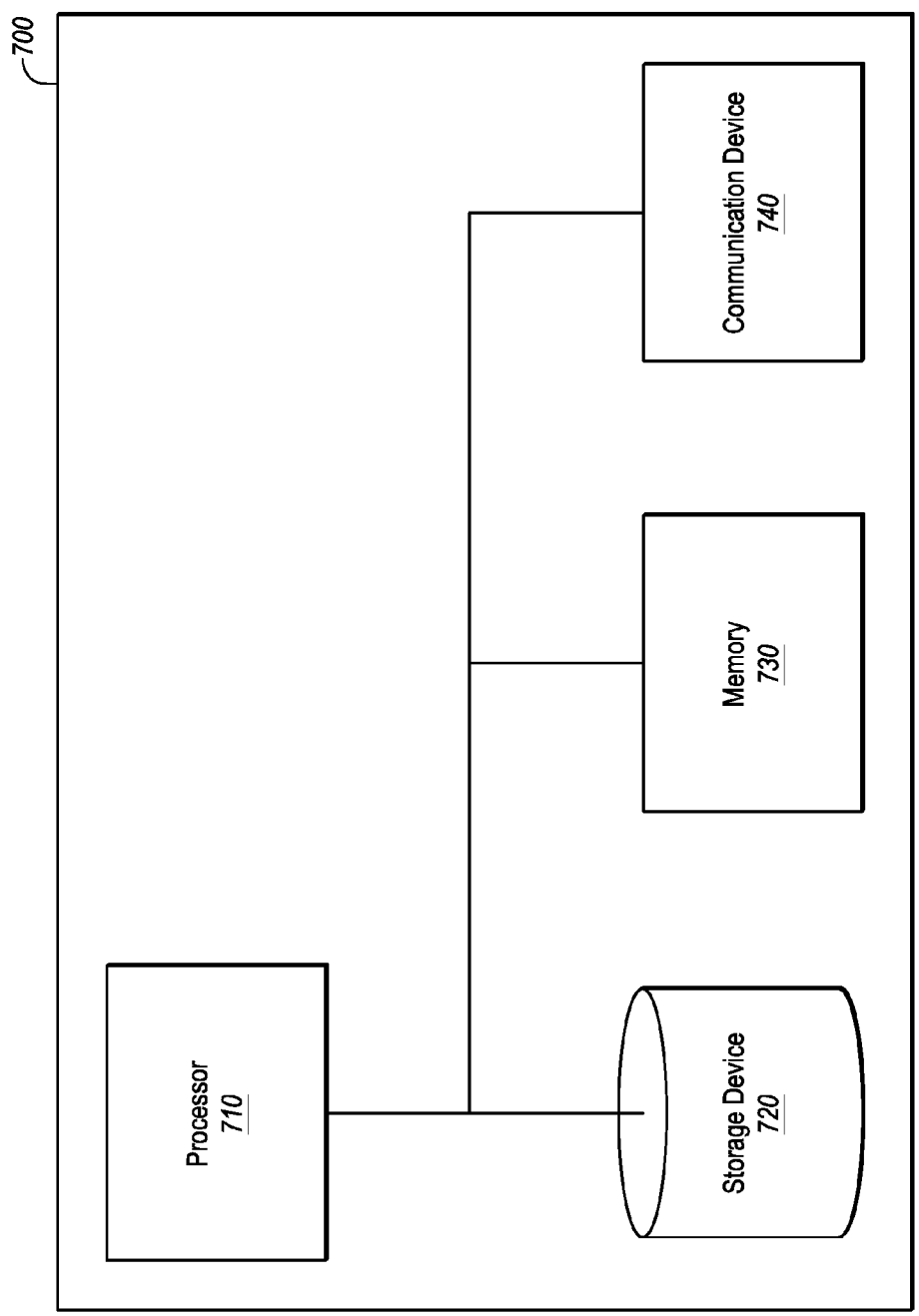
FIG. 9 is a block diagram of an example computing device.

FIG. 9 is a block diagram of an example computing device 700, in accordance with at least one embodiment of the present disclosure. Any of data consumer 110/510, network devices 120/520, and/or processing devices 130/530 of FIGS. 1 and 5 may be implemented as computing device 700. Computing device 700 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 700 may include a processor 710, a storage device 720, a memory 730, and a communication component 740. Processor 710, storage device 720, memory 730, and/or communication component 740 may all be communicatively coupled such that each of the components may communicate with the other components. Computing device 700 may perform any of the operations described in the present disclosure.

In general, processor 710 may include any suitable special-purpose or general-purpose computer, computing entity, or processing device including various computer hardware or software modules and may be configured to execute instructions stored on any applicable computer-readable storage media. For example, processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 9, processor 710 may include any number of processors configured to perform, individually or collectively, any number of operations described in the present disclosure.

In some embodiments, processor 710 may interpret and/or execute program instructions and/or process data stored in storage device 720, memory 730, or storage device 720 and memory 730. In some embodiments, processor 710 may fetch program instructions from storage device 720 and load the program instructions in memory 730. After the program instructions are loaded into memory 730, processor 710 may execute the program instructions.

For example, in some embodiments one or more of the processing operations of a process chain may be included in data storage 720 as program instructions. Processor 710 may fetch the program instructions of one or more of the processing operations and may load the program instructions of the processing operations in memory 730. After the program instructions of the processing operations are loaded into memory 730, processor 710 may execute the program instructions such that computing device 700 may implement the operations associated with the processing operations as directed by the program instructions.

Storage device 720 and memory 730 may include computer-readable storage media for carrying or having computer-executable instructions or data structures stored thereon. Such computer-readable storage media may include any available media that may be accessed by a general-purpose or special-purpose computer, such as processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

In some embodiments, storage device 720 and/or memory 730 may store data associated with an ICN network. For example, storage device 720 and/or memory 730 may store a PIT, a forwarding information base (FIB), and/or a content store.

Communication component 740 may include any device, system, component, or collection of components configured to allow or facilitate communication between computing device 700 and a network (e.g., network 150 of FIG. 1) For example, communication component 740 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication component 740 may permit data to be exchanged with any network (including network 150) such as a cellular network, a Wi-Fi network, a MAN, an optical network, etc., to name a few examples, and/or any other devices described in the present disclosure, including remote devices.

In some embodiments, communication component 740 may provide for communication within an ICN network. For example, communication component 740 may include one or more interfaces. In some embodiments, communication component 740 may include logical distinctions on a single physical component, for example, multiple interfaces across a single physical cable or optical signal.

Modifications, additions, or omissions may be made to FIG. 9 without departing from the scope of the present disclosure. For example, computing device 700 may include more or fewer elements than those illustrated and described in the present disclosure. For example, computing device 700 may include an integrated display device such as a screen of a tablet or mobile phone or may include an external monitor, a projector, a television, or other suitable display device that may be separate from and communicatively coupled to computing device 700.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of handling a packet in an information centric networking (ICN) network, the method comprising:
   receiving an interest packet at a network device, the interest packet comprising a name including one or more entries;
   determining whether the name of the interest packet includes a specific symbol;
   upon determining that the name of the interest packet includes the specific symbol, determining whether the network device is configured to perform at least one function identified by a final entry of the one or more entries of the interest packet;
   upon determining that the network device is configured to perform the function identified by the final entry, updating the name of the interest packet by removing the final entry from the name of the interest packet and thereby generating an updated interest packet; and
   upon determining that the network device is not configured to perform the function, forwarding the interest packet to another network device based on the function identified by the final entry.

2. The method of claim 1, further comprising, upon determining that the network device is configured to perform the function, performing the function.

3. The method of claim 1, further comprising adding two entries to a pending interest table (PIT) of the network device upon determining that the network device is configured to perform the function associated with the final entry.

4. The method of claim 3, wherein adding two entries to the PIT of the network device comprises:
   adding a first entry including the name of the interest packet and an interface identifier for a requesting network device; and
   adding a second entry including an updated name of the interest packet and an interface identifier for an application to perform the function.

5. The method of claim 1, further comprising:
   receiving a data packet including data;
   processing the data;
   updating a name of the data packet to identify the processed data; and
   routing the data packet including the processed data to a data consumer.

6. One or more non-transitory computer-readable media that include instructions that, when executed by one or more processing systems, are configured to cause the processing system to perform operations, the operations comprising:
- receiving, at a network device, an interest packet comprising a name including one or more entries;
- determining whether the name of the interest packet includes a specific symbol;
- upon determining that the name of the interest packet includes the specific symbol, determining whether the network device is configured to perform at least one function identified by a final entry of the one or more entries of the interest packet;
- upon determining that the network device is configured to perform the function identified by the final entry, updating the name of the interest packet by removing the final entry from the name of the interest packet and thereby generating an updated interest packet; and
- upon determining that the network device is not configured to perform the function, forwarding the interest packet to another network device based on the function identified by the final entry.

7. The non-transitory computer-readable media of claim 6, wherein the operations further comprise, upon determining that the network device is configured to perform the function, performing the function.

8. The non-transitory computer-readable media of claim 6, wherein the operations further comprise adding two entries to a pending interest table (PIT) of the network device upon determining that the network device is configured to perform the function associated with the final entry.

9. The non-transitory computer-readable media of claim 8, wherein adding two entries to the PIT of the network device comprises:
- adding a first entry including the name of the interest packet and an interface identifier for a requesting network device; and
- adding a second entry including an updated name of the interest packet and an interface identifier for an application to perform the function.

10. A network device for operating in an information centric networking (ICN) network, the network device comprising:
- an incoming interface;
- an outgoing interface;
- one or more processors; and
- a memory storing computer-readable instructions that, when executed by the processor, are configured to cause the processor to perform operations, the operations comprising:
- receiving an interest packet comprising a name including one or more entries;
- determining whether the name of the interest packet includes a specific symbol;
- upon determining that the name of the interest packet includes the specific symbol, determining whether the network device is configured to perform at least one function identified by a final entry of the one or more entries of the interest packet;
- upon determining that the network device is configured to perform the function identified by the final entry, updating the name of the interest packet by removing the final entry from the name of the interest packet and thereby generating an updated interest packet; and
- upon determining that the network device is not configured to perform the function, forwarding the interest packet to another network device based on the final entry.

11. The network device of claim 10, wherein the operations further comprise, upon determining that the network device is configured to perform the function, performing the function.

12. The network device of claim 10, wherein the operations further comprise adding two entries to a pending interest table (PIT) of the network device upon determining that the network device is configured to perform the function associated with the final entry.

13. The network device of claim 12, wherein adding two entries to the PIT of the network device comprises:
- adding a first entry including the name of the interest packet and an interface identifier for a requesting network device; and
- adding a second entry including an updated name of the interest packet and an interface identifier for an application to perform the function.

14. The network device of claim 10, wherein the operations further comprise:
- receiving a data packet including data;
- processing the data;
- updating a name of the data packet to identify the processed data; and
- routing the data packet including the processed data to a data consumer.

* * * * *